(12) United States Patent
Lovering et al.

(10) Patent No.: US 7,882,236 B2
(45) Date of Patent: Feb. 1, 2011

(54) COMMUNICATION CHANNEL MODEL

(75) Inventors: Bradford H. Lovering, Seattle, WA (US); David A. Wortendyke, Seattle, WA (US); Waingold L. Elliot, Seattle, WA (US); Erik B. Christensen, Seattle, WA (US); Kenneth D. Wolf, Seattle, WA (US); Michael S. Vernal, Seattle, WA (US); Shy Cohen, Bellevue, WA (US); Stefan H. Pharies, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1421 days.

(21) Appl. No.: 11/051,238

(22) Filed: Feb. 4, 2005

(65) Prior Publication Data

US 2006/0178152 A1 Aug. 10, 2006

(51) Int. Cl.
*G06F 15/16* (2006.01)
(52) U.S. Cl. ................... 709/227; 709/228; 709/229
(58) Field of Classification Search .......... 709/227–229
See application file for complete search history.

(56) References Cited

U.S. PATENT DOCUMENTS

| | | | | |
|---|---|---|---|---|
| 6,189,138 | B1 * | 2/2001 | Fowlow et al. | 717/107 |
| 6,425,017 | B1 | 7/2002 | Dievendorff et al. | |
| 6,442,620 | B1 | 8/2002 | Thatte et al. | |
| 6,633,923 | B1 | 10/2003 | Kukura et al. | |
| 6,990,513 | B2 | 1/2006 | Belfiore et al. | |
| 6,996,800 | B2 * | 2/2006 | Lucassen et al. | 717/106 |
| 7,181,526 | B1 * | 2/2007 | Bell et al. | 709/231 |
| 7,200,676 | B2 | 4/2007 | Christensen et al. | |
| 7,428,723 | B2 * | 9/2008 | Greene et al. | 717/103 |
| 2002/0143855 | A1 | 10/2002 | Traversat et al. | |
| 2002/0143944 | A1 | 10/2002 | Traversat et al. | |
| 2002/0147771 | A1 | 10/2002 | Traversat et al. | |

(Continued)

FOREIGN PATENT DOCUMENTS

CN 1533117 A 9/2004

(Continued)

OTHER PUBLICATIONS

Mukhi, N., et al., "Multi-Protocol Web Services for enterprises and the Grid", Euroweb. The web and the Grid: From E-Science to E-Business, Dec. 18, 2002.

(Continued)

*Primary Examiner*—Vivek Srivastava
*Assistant Examiner*—Thomas Duong
(74) *Attorney, Agent, or Firm*—Workman Nydegger

(57) ABSTRACT

The present invention provides for a channel model capable of generating a runtime communication channel with pluggable modular channel components. These channel components implement one of a set of standard interfaces that allow processing details of communication semantics between components to be represented in a polymorphic way. A message and corresponding communication semantics are recursively passed through the channel components using the standard interface, thereby abstracting other modules and components from specific implementation details of how the communication semantics are performed. The message may then be sent to the next appropriate module for further processing, or the processing may be completed at that particular component or module. Note also that the message can also be de-multiplexed on the service side in a similar fashion as that described above.

17 Claims, 5 Drawing Sheets

U.S. PATENT DOCUMENTS

| | | | |
|---|---|---|---|
| 2002/0147810 A1 | 10/2002 | Traversat et al. | |
| 2002/0152299 A1 | 10/2002 | Traversat et al. | |
| 2002/0156893 A1 | 10/2002 | Pouyoul et al. | |
| 2002/0184310 A1 | 12/2002 | Traversat et al. | |
| 2002/0184311 A1 | 12/2002 | Traversat et al. | |
| 2002/0184357 A1 | 12/2002 | Traversat et al. | |
| 2002/0184358 A1 | 12/2002 | Traversat et al. | |
| 2002/0188657 A1 | 12/2002 | Traversat et al. | |
| 2003/0002521 A1 | 1/2003 | Traversat et al. | |
| 2003/0028585 A1 | 2/2003 | Yeager et al. | |
| 2003/0041141 A1 | 2/2003 | Abdelaziz et al. | |
| 2003/0055894 A1 | 3/2003 | Yeager et al. | |
| 2003/0055898 A1 | 3/2003 | Yeager et al. | |
| 2003/0070070 A1 | 4/2003 | Yeager et al. | |
| 2003/0084127 A1 | 5/2003 | Budhiraja et al. | |
| 2003/0204645 A1* | 10/2003 | Sharma et al. | 709/328 |
| 2004/0249950 A1 | 12/2004 | Christensen | |
| 2006/0265689 A1* | 11/2006 | Kuznetsov et al. | 717/117 |

FOREIGN PATENT DOCUMENTS

| | | |
|---|---|---|
| EP | 1164482 | 12/2001 |
| EP | 1229442 A2 | 8/2002 |
| EP | 1463 259 | 9/2004 |
| EP | 1463259 | 9/2004 |
| EP | 1691285 | 8/2006 |
| WO | 0034857 | 6/2000 |
| WO | 03014927 | 2/2003 |

OTHER PUBLICATIONS

Curbera, F, et al. "Unraveling the Web Services Web: An Introduction to SOAP, WSDL, and UDDI", IEEE Internet Computing, IEEE Services Center, New York, NY, USA, vol. 6, No. 2, 2002.

Woolf, B. "The Object Recursion Pattern", Retrieved from the Internet: URL:http://industriallogic.com/patterns/P21.pdf> Aug. 1998.

Simmonds, Devon; and Ghosh, Sudipto; "Middleware Transparency through Aspect-Oriented Programming Using AspectJ and Jini," Proceedings of the SPIE—International Society for Optical Engineering, Jul. 3-Aug. 1, 2002, vol. 4863, pp. 16-27.

Clemente, Pedro J.; Hernandez, Juan; Murillo, Juan M.; Perez, Miguel A.; and Sanchez, Fernando; "AspectCCM: An aspect-oriented extension of the Corba Component Model," Proceedings 28th Euromicro Conference, Sep. 4-6, 2002, pp. 10-16.

Singh, Gurdip; Maddula, Bob; Qiang Zeng; "Enhancing Real-Time Event Service for Synchronization in Object Oriented Distributed Systems," Proceedings Fifth IEEE International Symposium on Object-Oriented Real-Time Distributed Computing. ISIRC 2002, Apr. 29-May 1, 2002, pp. 233-240.

Gray, Jeff; "Using Software Component Generators to Construct a Meta-Weaver Framework," Proceedings of the 23rd International Conference on Software Engineering. ICSE 2001, May 12-19, 2001, pp. 789-790.

Walker, Robert J.; Baniassad, Elisa L.A.; and Murphy, Gail C.; "An initial Assessment of Aspect-oriented Programming," Proceedings of the 1999 International Conference on Software Engineering (ICSE '99), May 16-22, 1999, pp. 120-130.

Nebbe, Robb, D.; "Coordinating and Composition: The Two Paradigms Underlying AOP?" Object-Oriented Technology. ECOOP'98 Workshop Reader. ECOOP'98 Workshops, Demos, and Posters, Jul. 20-24, 1998, pp. 402-405.

Bradbury, Danny; ".Net benefits," Application Development Advisor, Oct. 2001, vol. 5, No. 8, pp. 16-18.

Van Nieuwpoort, Rob; Maassen, Jason, and Bal, Henri E.: "Widearea parallel programming using the remote method invocation model," Concurrency; Practice and Experience, Jul. 2000, vol. 12, No. 8, pp. 643-666.

Bogunovic, Nikola; "A Programming Model for Composing DataFlow Collaborative Applications" Proceedings ECDS'99. IEEE Conference and Workshop on Engineering of Computer-Based Systems, Mar. 7-12, 1999, pp. 106-112.

WebMethods, "Implementing Enterprise Web Services with the WebMethods Integration Platform" WebMethods, Inc., Mar. 2002.

Sahai, A., et al, "Message Tracking in SOAP-Based Web Services" Institute of Electrical and Electronics Engineers, 2002 IEEE/IFIP Network Operations and Management Symposium, Apr. 2002.

Curbera F. et al., "Unraveling the Web Services Web: An Introduction to SOAP, WSDL, and UDDI" IEEE Internet Computing, IEEE Service Center, Piscataway, NJ, vol. 6 No. 2, 2002, pp. 86-93.

Office Action for U.S. Appl. No. 10/400,747 mailed Aug. 24, 2006.

Fensel et al. "The Web Services Modeling Framework WSMF", 2002.

Kreger, "IBM Web Services Conceptual Architecture (WSCA 1.0)", May 2001.

Notice of Allowance for U.S. Appl. No. 10/400,747 mailed Jan. 31, 2007.

Mukhi, N.; Khalaf, R., "Multi-protocol Web Services for Enterprises and Grid", Euroweb 2002, IBM Corporation 2002, pp. 1-10.

Woolf, Bobby, "The Object Recursion Pattern", Jul. 27, 1998, pp. 1-8.

Proceedings of the 21st international conference on Software engineering 1999, Los Angeles, California, United States, May 16-22, 1999, pp. 121-130.

* cited by examiner

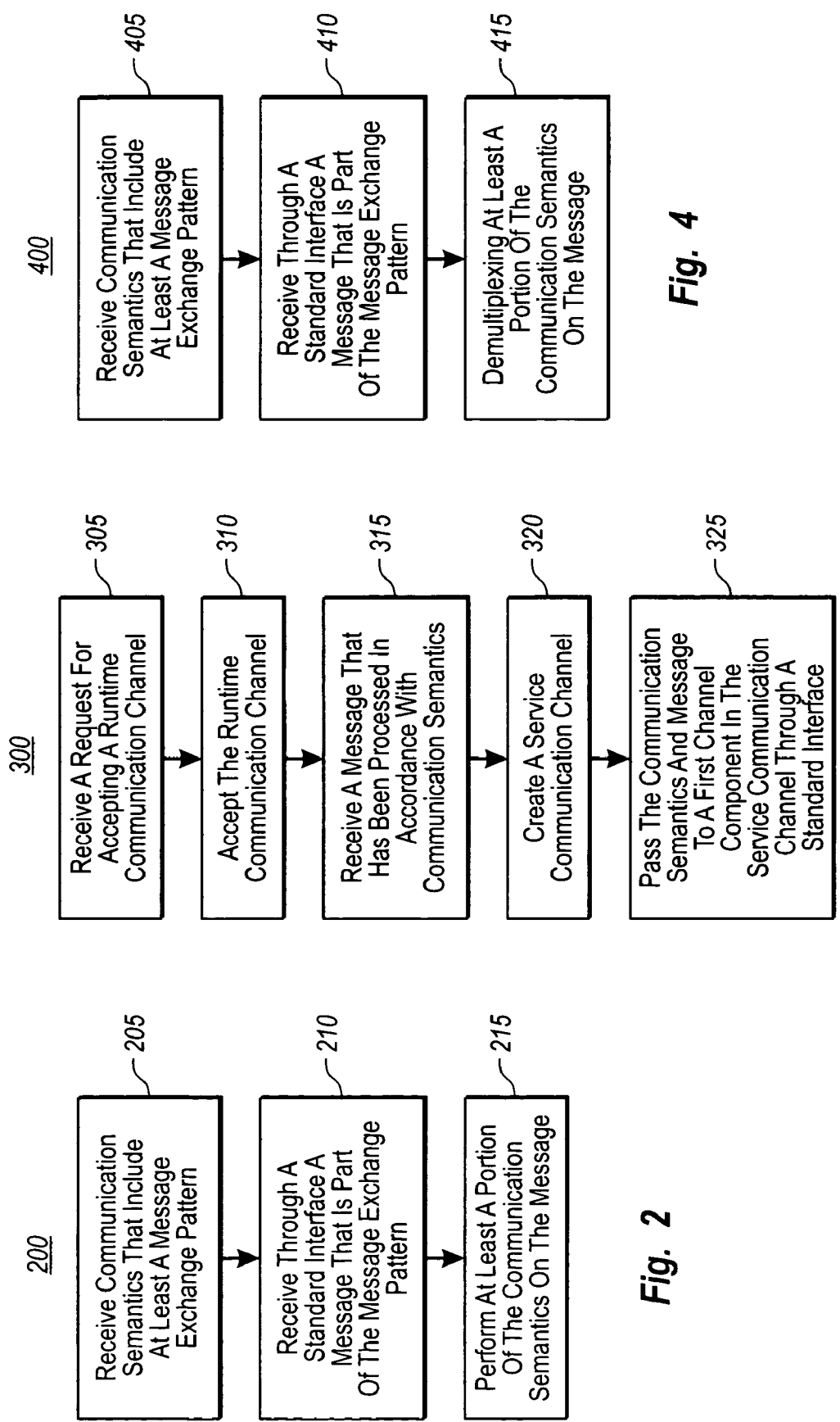

COMMUNICATION CHANNEL MODEL

CROSS-REFERENCE TO RELATED APPLICATIONS

N/A

BACKGROUND OF THE INVENTION

1. The Field of the Invention

The present invention generally relates to the transfer of messages between endpoints in a service oriented system. More specifically, the present invention provides for a runtime communication channel with pluggable modular channel components that utilize one of a set of standard interfaces. Such a system allows processing details of communication semantics between channel components to be represented in a polymorphic way.

2. Background and Related Art

Computer systems and related technology affect many aspects of society. Indeed, the computer system's ability to process information has transformed the way we live and work. Computer systems now commonly perform a host of tasks (e.g., word processing, scheduling, database management, etc.) that prior to the advent of computer systems were performed manually. More recently, computer systems have been coupled to one another to form computer networks over which the computer systems can communicate electronically to share data. Service oriented systems (e.g., Web Services) have been a driving force in advancing such communications between computer systems and is turning the way we build and use software inside-out.

Service oriented architectures let applications share data, and—more powerfully—invoke capabilities from other applications without regard to how those applications were built, what operating system or platform they run on, and what devices are used to access them. Typically, these systems are invoked over the Internet by means of industry-standard protocols including SOAP (Simple Object Access Protocol), XML (extensible Markup Language), UDDI (Universal Description Discovery Integration), WSDL (Web Service Description Language), etc. Although these services remain independent of each other, they can loosely link themselves into a collaborating group that performs a particular task.

Often, electronic communication in a service oriented network includes a client computer system (hereafter referred to as a "client") requesting access from a network service(s) (e.g., Web Services) at a server computer system (hereinafter referred to as a "service"). Accordingly, the client sends a request to the service for particular access to its system resources, wherein if the client is authorized and validated, the service responds, e.g., with a response message providing the desired information. Of course, other message exchange patterns between a client and a service (as well as other communication semantics described below) are available and include simple singleton messages as well as more sophisticated multi-message exchanges like, e.g., notifications, solicit-response, pub-sub patterns, polling, queuing and others.

To generate a service, a developer writes source code (e.g., C#, C++, or Visual Basic) in accordance with a specified programming model. The source code can then be compiled into a service type and the service type executed in a server runtime to provide the service to client consumers. Different programming models, however, can implement distributed messaging functionality in different ways. For example, one programming model can implement both a request message and a corresponding reply message using a single interface that has separate methods. The single interface can have one method for the request message and a second different method for the corresponding reply message.

Different programming models can also be configured in accordance with different communication semantics. For example, each model can have different encoding, transports, security options, reliable messaging options, message logging options, connection throttling options, etc. Thus, two services that are designed to implement the same functionality (e.g., performing a mathematical operation) may implement the functionality differently.

Further, distributed applications are typically rigid in their programming models allowing only one programming model that is tightly coupled to their service runtime. Accordingly, for compatibility, a client runtime (e.g., at a service consumer) is typically required to utilize a client program or module developed in accordance with the same programming model as the server runtime. For example, if a service was developed using separate interfaces for request and reply messages or uses a particular message encoding and transport protocol, the service consumer must implement those as well. Failure to use a client program or module developed in accordance with the service runtime.

Such rigidity and tight coupling to the specific communication semantics specified by the service developer have several inherent drawbacks. For example, typically companies use proprietary network communication semantics to distribute services within its own network. They may have specific requirements for security, reliability, type of transport and encoding to use, etc. If that company acquires another company (e.g., through a merger or acquisition), the acquired companies systems must also be able to implement these specific communication semantics or protocols. Such requirement, however, is very unlikely and as such the acquired company's applications (or acquiring company's applications) must be rewritten or configured to conform to the specified communication semantics.

As can easily be seen, such reworking and/or reconfiguration can be costly and does not accurately reflect the fundamental purpose of service oriented architectures (e.g., Web Services), which is to provide services to a multitude of devices in an environment agnostic way. Accordingly, there exists a need to model communication semantics in an extensible and pluggable way in order to make the system more flexible to changing needs.

BRIEF SUMMARY OF THE INVENTION

The above-identified deficiencies and drawbacks of current distributed systems are overcome through various example embodiments of the present invention. For example, the present invention provides for a channel model capable of configuring a message for transfer between endpoints by recursively passing the message through pluggable modular channel components of a runtime communication channel. Each of the pluggable modular channel components implement one of a set of standard interfaces that allow processing details of communication semantics between components to be represented in a polymorphic way.

In one example embodiment, communication semantics are received at a first channel component in a runtime communication channel. The communication semantics include at least a message exchange pattern and are received through a standard interface selected from a plurality of standard interfaces based on the message exchange pattern. A message is also received through the standard interface and is part of the message exchange pattern. At least a portion of the communication semantics can then be performed on the message, wherein the standard interface abstracts implementation details for performing the at least a portion of the communication semantics on the message from other components or modules that interact with the runtime communication channel. The de-multiplexing of at least a portion of the communication semantics may also be performed using channel components in a similar manner.

Other example embodiments provide for a channel model configured to accept a runtime communication for de-multiplexing a message. In this embodiment, a request for accepting a runtime communication channel is received at a listener. The runtime communication channel is then accepted and corresponds to communication semantics that include at least a message exchange pattern. Thereafter or prior to, a message that has been processed in accordance with the communication semantics and is part of the message exchange pattern is received. Further, a service communication channel for de-multiplexing the message in accordance with the communication semantics is created and the communication semantics can be passed to a first channel component in the service communication channel. The communication semantics are passed through a standard interface selected from a plurality of standard interfaces based on the message exchange pattern. The message is also then passed to the first channel component through the standard interface for de-multiplexing at least a portion of the communication semantics, wherein the standard interface abstracts implementation details for performing the at least a portion of the communication semantics on the message from other components or modules that interact with the runtime communication channel.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a flowchart of a method of configuring messages for transfer between endpoints in accordance with exemplary embodiments;

FIG. 3 illustrates a flowchart of a method for accepting a runtime channel in accordance with exemplary embodiments;

FIG. 4 illustrates a flow diagram of a method of de-multiplexing a message for consumption at an endpoint in accordance with exemplary embodiments.

DETAILED DESCRIPTION OF THE PREFERRED EMBODIMENTS

The present invention extends to methods, systems and computer program products for a runtime communication channel with pluggable modular channel components that utilize one of a set of standard interfaces. The embodiments of the present invention may comprise a special purpose or general-purpose computer including various computer hardware, as discussed in greater detail below.

Figure 1A:
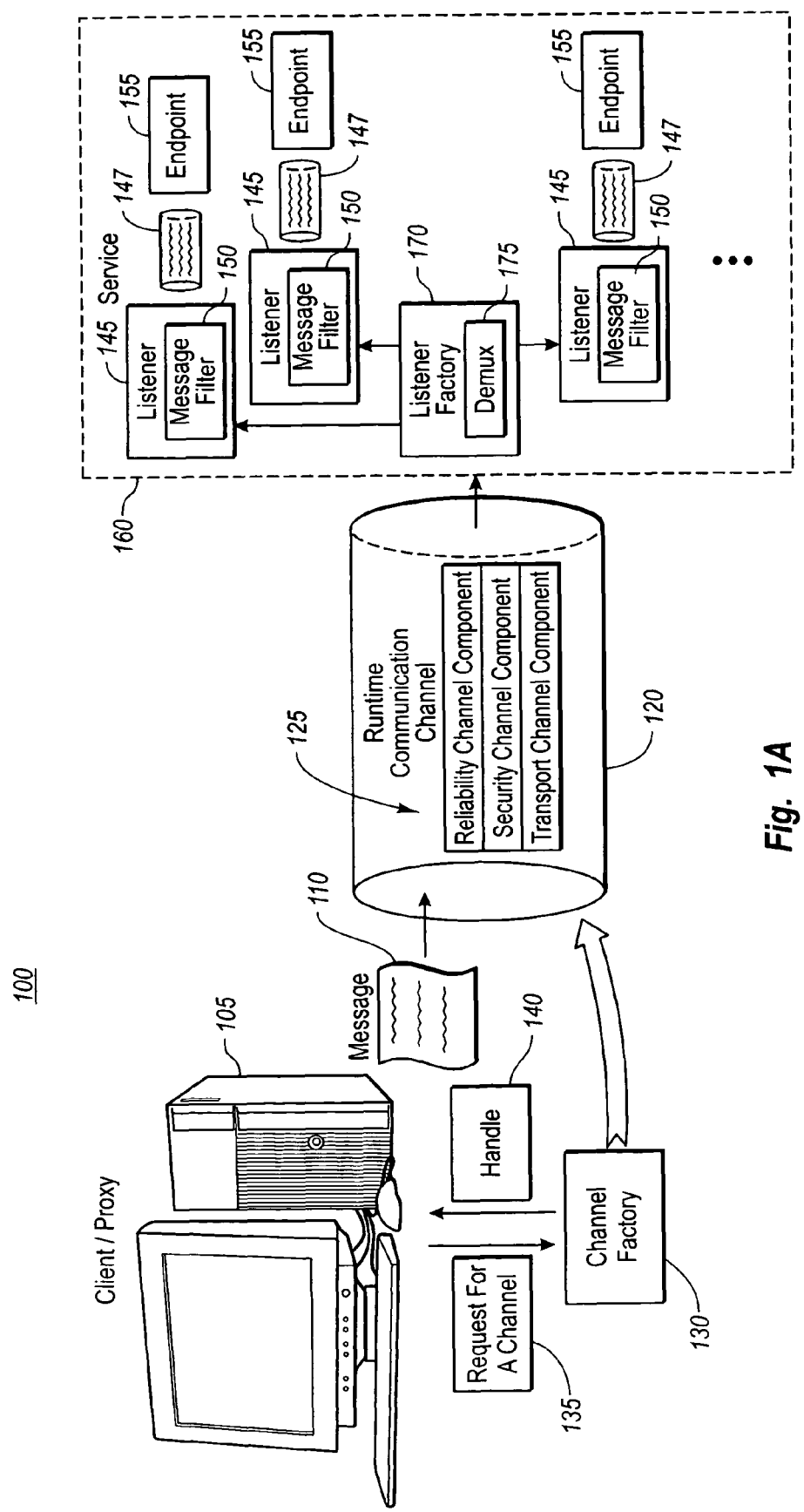
FIG. 1A illustrates a distributed system with a runtime communication channel generated in accordance with example embodiments of the present invention.

Generally, the present invention provides for a channel model capable of generating a runtime communication channel with pluggable modular channel components. These channel components implement one of a set of standard interfaces that allow processing details of communication semantics between components or modules to be represented in a polymorphic way. FIG. 1A illustrates a specific instance of such an exemplary communication channel in a service oriented system.

In the distributed system 100, a client or proxy 105 desires access to the services offered by service 160 and sends message 110 to service 160 for processing. Broadly speaking, a service 160 is a collection of endpoints 155 and an endpoint 155 represents a piece of code, at a location, that can send and receive certain types of messages. In order to access the services, the client actively requests a channel from channel factory 130. The channel factory 130 provides a mechanism for creating a channel to an endpoint 155 of the service 160. Channels, e.g., runtime communication channel 120, represent the core abstraction for exchanging messages between client 105 and service 160. As will be discussed in greater detail below, the runtime communication channel 120 communicates between various channel components 125 and modules using one of a set of standard interfaces, thereby abstracting particular implementations details within each channel component 125 from other components 125 and modules within the distributed system (note that the terms "component" and "module" are used interchangeably herein).

Channel factory 130 creates the runtime communication channel 120 and returns a handle 140 (which may be the runtime communication channel 125 or an identifier thereof) back to the client 105. The client 105 may then use the runtime communication channel to pass message 110 to the service 160 in accordance with specified communication semantics typically derived by the service developer (note, however, that the communication semantics may also be default values or values overridden by a system administrator on the service side). Exemplary embodiments provide the channels 120, 125 are typed and created according to various communication semantics, e.g., the message exchange pattern (MEP) which they implement. A message exchange pattern represents a pattern for message communication between client 105 and service 160, or other service endpoints as the case may be. Current embodiments support a number of primitive message exchange patterns including, but not limited to, one-way (e.g., output channel and input channel) request-reply (request channel and reply channel) and duplex messaging (duplex channel). Note that these MEPs are fully extensible. As such, sub-sets or deviations of the above described MEPs can be implemented as needed. In addition, as described in greater detail below, each of these MEPs may be sessionful.

Other example embodiments provide that the runtime communication channel 120—including the individual channel components 125—an be typed and created according to other communication semantics such as reliability (e.g., WS-ReliableMessaging, HTTPR, etc.), security (e.g., WS-Security, HTTPS, type of signing, type of encryption, etc.), whether or not the channel supports unicast or multicast, whether or not sessions are supported, transacted support, queuing, publish and subscribe, an encoding mechanism (e.g., SOAP envelope, binary, text, etc.), and what transport to use for exchanging the message with a service (e.g., HTTP (HyperText Transport Protocol), FTP (File Transfer Protocol), SMTP (Simple Message Transfer Protocol), TCP (Transmission Control Protocol), UDP (User Datagram Protocol), SMS (Short Message Service), SNA (Systems Network Architecture), GPRS (General Packet Radio Service), etc.).

Note also that there are many other types of communication semantics that are used to type the runtime communication channel 120. Accordingly, the above list is not meant to be all inclusive, and any specific reference to a communication semantic for creating or typing the runtime communication channel 120 is used for illustrative purposes only and is not meant to limit or otherwise narrow the scope of the present invention unless explicitly claimed.

Regardless of how the runtime communication channel 120 is typed and created, the channel 120 represents a input/output (I/O) abstraction and is responsible for: (1) accepting application data or messages 110 (e.g., SOAP messages); (2) implementing the various communication semantics (shown here as a reliability channel component 125, a security channel component 125 and a transport channel component 125); (3) formatting the message 110 for transmission in accordance with the channel components 125; and (4) transmitting the message 110 over the "wire".

At the service side 160, a listener factory 170 listens on a particular network address for new messages, e.g., message 110, and provides a mechanism for creating a listener 145 that communications with a particular endpoint 155 of the service. Each particular listener 145 has a unique message filter 150 such that messages 110 that are received from listener factory 170 that match a particular listener's 145's filter are delivered to that listener 145. In other words, listener factory 170 utilizes demux 175 to de-multiplex a portion of the message 110 and send the message to the appropriate listener 145 based on its message filter 150.

A listener 145 represents an abstraction for listening for and accepting new runtime communication channels 120 on the service side 160. When an endpoint 155 is ready, it will call "accept channel." When a new channel 120 is detected by a listener 145, the call to "accept channel" could complete, notifying the appropriate endpoint 155 to the presence of a new channel 120. This service communication channel 147 may then be used in the reverse way of the runtime communication channel 120 in order to de-multiplex communication semantics on the message 110 in order for the endpoint 155 to appropriately process message 110. In other words, the message 110 is recursively passed through the pluggable modular channel components of the service communication channel 147 for de-multiplexing the communication semantics implemented at the runtime communication channel 120.

Note that although a different communication channel is created, the session communication channel could be the same as the runtime communication channel 120. In other words, the listener 145 may use the same runtime communication channel 120, just in reverse order. Accordingly, the service communication channel 147 should be broadly construed to include the runtime communication channel 120.

Other example embodiments provide that the message exchange patterns described above can have both connectionless channels, and connection-oriented channels, e.g., session channels. Generally, a session is a shared context among all participants in a message exchange pattern. A session may have three main components: (1) session establishment—a process for establishing shared context among all participants; (2) message correlation—a method of correlating a group of messages to an instance of shared context; and (3) session termination—a process for terminating the shared context amongst all participants. Note that both session establishment and session termination may be explicit or implicit. That is, there may be an explicit session establishment (e.g., in reliability and TCP), or the session establishment may be implicit (e.g., a correlation ID is used). Exemplary embodiments also provide for session channels that are direct sessions (where the life of the session is coupled to the lifetime of the channel 120) and queued sessions (where these two lifetimes are decoupled).

For connectionless channels, exemplary embodiments provide for no correlation between the number of times a client 105 may call or request a runtime communication channel 120 and the number of times a service 160 makes a call or accepts a channel 120 (where typically all messages transmitted over these types of channels 120 are considered data grams). For "direct" sessions, there is typically a one-to-one correspondence between the number of times a client calls or requests a channel 135 to a service 160 and the number of times a service 160 calls "accept channel." For "queued" sessions, there is a single session that is shared amongst the parties involved. Channels may be attached to/detached from the session without altering the state of the session. Thus there is no correspondence between the number of times that a client 105 requests a runtime communication channel 120 and the number of times that a service 160 accepts the channel 120.

Exemplary embodiments provide that the communication objects (e.g., channel factory 130, listener factory 170, listeners 145, and channels 120) share a common state machine. An example of the common state machine transition is show in FIG. 1C and has three main states and three intermediate states. In general, the communication object begins in the created 192 state. In the created 192 state, an object may be configured, event registration may occur, etc. Once a user is finished configuring the object, the user may transition the object into the opened 196 state using the Open( ) call. This will cause the object to be active and useable. Note that there is an intermediary state between the created 192 state and the opened 196 state, which is where the object is in-between the beginning of the Open( ) call and when the Open( ) call completes. Accordingly, the communication objects are locked down and can be acted on, but I/O shouldn't be accepted yet.

An object may cease being useable in either a graceful or ungraceful manner. The object may gracefully close by calling the Close( ) event from the opened 196 state—this will transition the object from the opened 196 state into the closed 198 state. Alternatively, an error condition or external stimulus may cause the object to ungracefully abort. Accordingly, as noted in FIG. 1C, at any main state, an Abort( ) call can be made to transition the communication object from the current state to the closed 198 state. Note that errors may occur prior to handling data and that errors during processing of the message 110 are propagated through standard exceptions. Further note that session failures may also be propagated via an Abort( ) event.

Figure 1B:
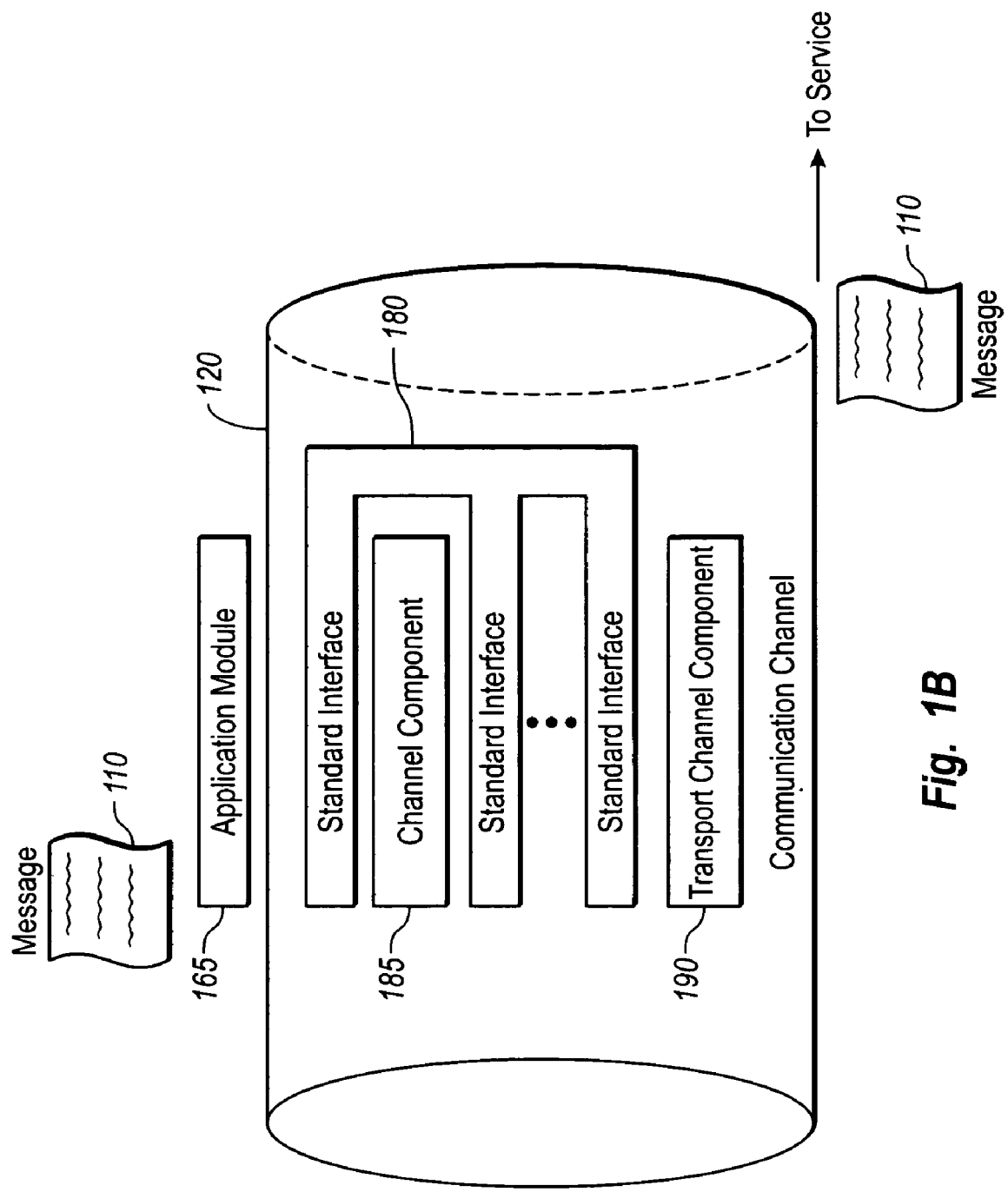
FIG. 1B illustrates the use of one of a set of standard interfaces between channel components of a runtime communication channel in accordance with example embodiments.
Figure 1C:
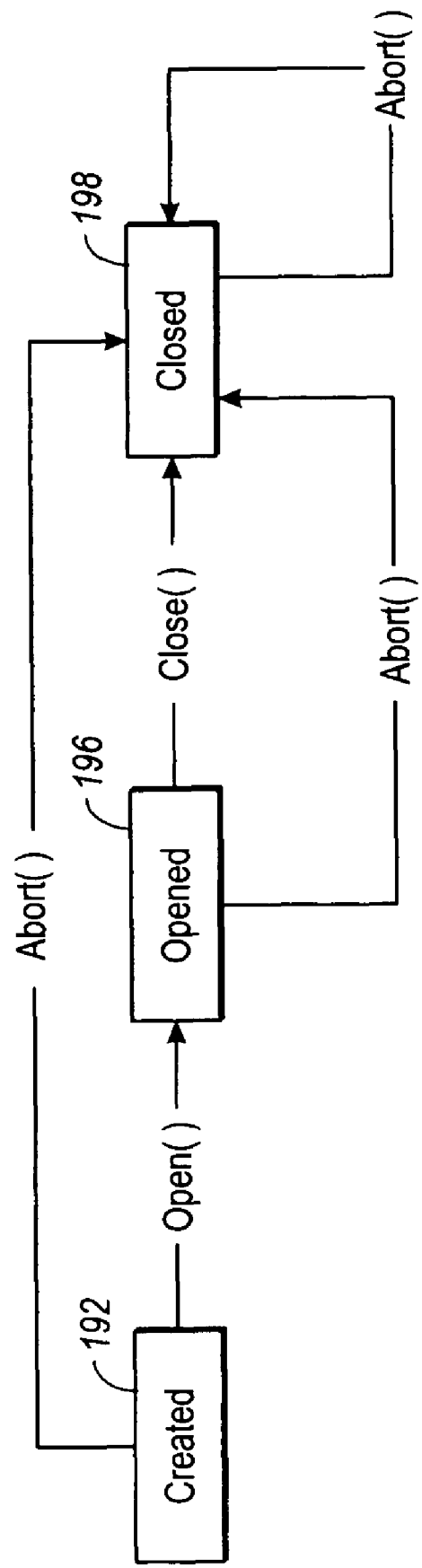
FIG. 1C illustrates common state machine transitions in accordance with exemplary embodiments.

FIG. 1B illustrates a more detailed model of the runtime communication channel 120 in accordance with example embodiments. As shown, each object within the communication channel 120 communicates using a standard interface 180. Standard interface 180 is a simple interface that passes the communication semantics from one module 165 or component 185, 190 to another. Further, this standard interface 180 is one of a set of standard interfaces that are selected based on any of the aforementioned message exchange patterns. Various channel components 185, 190—or even the application module 165—may perform portions of the communication semantics. The remaining portions may then be passed through the standard interface 180 to subsequent channel components 185, 190 within the communication channel 120.

Note that any one of the various channel components 185, 190 may complete the communication semantics on the message 110. For example, if the channel component is a reliability component, and the message 110 is a duplicate, then the channel component can complete the communication semantics by simply dropping the message 110. Another example may be the establishment of a session in a protocol that uses explicit session creation, wherein there are messages 110 that may be exchanged between lower channel components (e.g., transport channel component 190) without the higher channel components or modules (e.g., channel component 185) ever knowing about these messages 110. As such, message 110 may or may not propagate through each channel component 185, 190 or other components or modules (e.g., application module 165) that interact with the runtime communication channel 120.

For example, a message 110 may be received at application module 165 where communication semantics of a request-reply and security are received. The application module 165 can use the standard interface 180 to relay or delegate these communication semantics through the various channel components 185, 190, wherein each channel component is abstracted from the specific implementation details of the other components 185, 190 or modules 165. For instance, channel component 185 may implement the security component using, e.g., WS-Security, and the transport channel component 190 may be a request-reply transport, e.g., HTTP. Accordingly, the communication semantics can be performed by the different channel components 185, 190 within the communication channel 120, while the other components 185, 190 or modules 165 are abstracted from the specific implementation details.

Because of this layer of abstraction the components 185, 190 or modules 165 that perform the specific communication semantics are provided in a polymorphic manner. Accordingly, as an alternative, application module 165 may pass the same communication semantics (i.e., request-reply and security) through the standard interface 180 to a single channel component (in particular transport channel component 190) that can execute the indicated communication semantics using, e.g., HTTPS. Further, any number of channel components 185 may communicate through the standard interface 180 and provide portions of the overall communication semantics. Thereafter, the channel component 185, 190 (or a module, e.g., application module 165) can pass the remaining portions through the standard interface 180 and be abstracted from the specific implementations of how the communication semantics are stratified.

As can be seen, each channel component 185, 190 is completely pluggable, such that as new channel components 185, 190 are needed or old channel components undesired they can simply be plugged in and out of the overall communication channel 120. Moreover, because the model is represented in a polymorphic way, the channels themselves are extensible. For instance, in the example given above, the request-reply communication semantic could have been satisfied by an alternative transport, e.g., TCP, without breaking the model. Accordingly, each channel component 185 is fully extensible as well as pluggable thereby binding the communication channel 120 to only a message exchange pattern. This fully extensible and pluggable model has several advantageous features. For example, as updated versions and new communication semantics become available, they can be plugged into the system without breaking or having to rewrite the current communication channel 120.

Although the communication channel is bound to a MEP, as mentioned above, the message exchange patterns themselves are also extensible and pluggable. Accordingly, as new message exchange patterns are identified and developed these communication semantics can also be modeled or added in a similar fashion as that described above. Note that because each communication component 185, 190 is extensible and pluggable, the present invention is not tied to any particular communication semantic other than the particular message exchange pattern. As such, any particular reference to a communication semantic is used for used for illustrative purposes only and it is not meant to limit or otherwise narrow the scope of the present invention unless explicitly claimed.

Note also, that ordering of the channel components 185 may be interchangeable. For example, a channel component 185 for security may happen before a channel component 185 for reliability. The ordering of these two channel components 185, however, can be interchanged such that the reliability communication semantic occurs before the security communication semantic. Accordingly, unlike other rigid models, the current communication channel is flexible, scalable, pluggable and extensible.

Although the specific implementation details of the channel components 185 are abstracted from the application module 165, there may be times when the application 165 needs to know if specific communication semantics are supported. Accordingly, the present invention provides for channel inspection and control, wherein various channel components within the communication channel 120 can be queried to determine if they perform a portion of the overall communication semantics. This information is then relayed to the application module 165. Note that although the application module 165 can determine that communication semantics may be satisfied, it still may not know the specific implementation details, such as which channel component 185, 190 will perform the communication semantics and how.

Note that in the event of certain message exchange patterns, e.g., (duplex MEPs) a reverse runtime communication channel 120 may be needed. Accordingly, other example embodiments provide that the runtime communication channel 120 may be typed and/or created on the basis of receiving a first runtime communication channel 120. In this embodiment, the roles of the service 160 and client 105 are reversed upon the service 160 receiving and accepting, a runtime communication channel 120 from the client 105. In particular, upon receiving a runtime communication channel 120 from the client 105, the service 160 may request 135 a channel from a channel factory 130, receive a handle 140, and process a reply message in accordance with a runtime communication channel 120 created from the channel factory 130. The client 105 may then de-multiplex the reply message in accordance with the example embodiments described above.

The present invention may also be described in terms of methods comprising functional steps and/or non-functional acts. The following is a description of steps and/or acts that may be preformed in practicing the present invention. Usually, functional steps describe the invention in terms of results that are accomplished whereas non-functional acts describe more specific actions for achieving a particular result. Although the functional steps and/or non-functional acts may be described or claimed in a particular order, the present invention is not necessarily limited to any particular order or combination of steps and/or acts. Further, the use of steps and/or acts in the recitation of the claims—and in the following description of the flowcharts for FIGS. 2-4—is used to indicate the desired specific use of such terms.

FIGS. 2-4 illustrate example flow diagrams for various exemplary embodiments of the present invention. The following description of FIGS. 2-4 will occasionally refer to corresponding elements from FIGS. 1A-C. Although reference may be made to a specific element from these Figures, such elements are used for used for illustrative purposes only and are not meant to limit or otherwise narrow the scope of the present invention unless explicitly claimed.

FIG. 2 illustrates and example flowchart of a method 200 of configuring a message for transfer between endpoints by recursively passing the message through pluggable modular channel components of a runtime communication channel. Each of the pluggable modular channel component implement one of a plurality of standard interfaces that allow processing details of communication semantics between components to be represented in a polymorphic way.

Method 200 includes an act of receiving 205 communication semantics that include at least a message exchange pattern. For example, a first channel component 185 in a runtime communication channel 120 may receive communication semantics that include one or more of an input, an output, a request, a reply, duplex, or sessionful state for any of these. Other communication semantics also include a transport type, an encoding type, unicast support, multicast support, transaction support, security support, protection support, reliable messaging guarantees, publish & subscribe support, and queued support. Such communication semantics are received through a standard interface selected from a plurality of standard interfaces based on the message exchange pattern. (Note that "plurality" (which means two or more), not "set" (which can mean a all available options), is used in the following description of the flowcharts and in the recitation of the claims. Accordingly, the present invention does not require that all standard interfaces be available to select from.)

Method 200 also includes an act of receiving 210 through the standard interface a message that is part of the message exchange pattern. For example, communication component 185 may receive message 110 through standard interface 180. Thereafter, method 200 also includes an act of performing 215 at least a portion of the communication semantics on the message. For example, as in the example above where communication semantics are request-reply message exchange pattern and security (e.g., WS-Security) channel component 185 may perform the security portion of the communication semantics on the message.

Note that standard interface 180 abstracts implementation details for performing the at least a portion of the communication semantics on the message 110 from other components or modules that interact with the runtime communication channel. For example, the implementation details within the first channel component 185 are abstracted from application module 165, transport channel component 190, and other modules or components that interact with the runtime communication channel 120.

Thereafter, the message 110 and its remaining communication semantics, if any, may (or may not as previously described) be sent to the next appropriate module or component for further processing. For example, communication component 185 can send message 110 and any remaining communication semantics through the standard interface 180. This process can be recursively performed through such modular components until all of the communication semantics have been implemented, at which time the message 110 can be sent to the service for de-multiplexing of the communication semantics. Alternatively, if the first channel component 185 completes the communication semantics, the message 110 will not be passed to other channel components 190 or modules 165 that interact with the runtime communication channel 120.

FIG. 3 illustrates an example flow diagram of a method 300 of creating a service communication channel configured to de-multiplex communication semantics from a message. Method 300 includes an act of receiving 305 a request for accepting a runtime communication channel. Accordingly, at service 160, a listener factory 170 or listener 145 may receive a message 110. If the listener factory 170 receives the message 110, it can use demux 175 to de-multiplex a portion of the message and generate an appropriate listener 145. Thereafter, the listener with the appropriate message filter 150 may be sent the runtime communication channel 120.

Method 300 also includes an act of accepting 310 the runtime communication channel. For example, when endpoint 155 is ready, it will call "accept channel," and that call may be returned when runtime communication channel 120 is detected by a listener 145. The runtime communication channel 120 corresponds to communication semantics that include at least a message exchange pattern. This message exchange pattern may be any of the aforementioned exchange patterns or any new or other well known message exchange pattern.

Thereafter, method 300 also includes an act of receiving 315 a message that has been processed in accordance with the communication semantics. For example, listener 145 may receive message 110 that has been processed in accordance with such communication semantics as reliability, security and a request-reply message exchange pattern. Method 300 further includes an act of creating 320 a service communication channel. For example, listener 145 upon receiving the message and communication semantics such as the message exchange pattern can create a service communication channel 147 for de-multiplexing the message in accordance with the communication semantics. Thereafter, method 300 includes an act of passing 325 the communication semantics and the message to a first channel component in the service communication channel through a standard interface for de-multiplexing at least a portion of the message 110. The standard interface 180 is selected from a plurality of standard interfaces based on the message exchange pattern. Further, the standard interface 180 abstracts implementation details for the de-multiplexing of at least a portion of the message 110 from other components or modules that interact with the service communication channel 120.

The message and communication semantics may be delegated in a similar manner as described above with regard to the runtime communication channel 120. Rather then processing the message 110 in accordance with the communication semantics, however, the message is de-multiplexed wherein at least a portion of the message is de-multiplexed in accordance with communication semantics. Thereafter, the message may be recursively passed to other modules and components for further processing, (e.g., the message may be sent to endpoint 155 for processing the message and replying with an output).

More specifically, as shown in FIG. 4, the present invention provides for a method 400 of processing a message for consumption at an endpoint within a service by recursively passing the message through pluggable modular channel components of a service communication channel. Similar to method 300, method 400 includes an act of receiving 405 communication semantics that include at least a message exchange pattern. The communication semantics received, as noted above, through a standard interface selected from a plurality of standard interfaces based on the message exchange pattern. Method 400 also includes an act of receiving 410 through a standard interface a message that is part of the message exchange pattern. The message 110 being processed in accordance with various communication semantics such as, e.g., reliability, security, and an output for the message exchange pattern.

Thereafter, method 400 includes an act of de-multiplexing 415 at least a portion of the communication semantics on the message. In particular, a channel component within service channel 147 can de-multiplex at least a portion of the communication semantics that are on the message, e.g., the reliability portion. The standard interface abstracts implementation details for de-multiplexing the at least a portion of the communication semantics on the message from other components or modules that interact with the service communication channel.

As before, the message and the remaining communication semantics may or may not be sent or passed to other channel components or modules e.g., endpoint 155 for the appropriate processing. This is conditioned as previously mentioned on whether or not the channel component completes the communication semantics (e.g., when the message 110 is dropped or communicated between lower components only).

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 5:
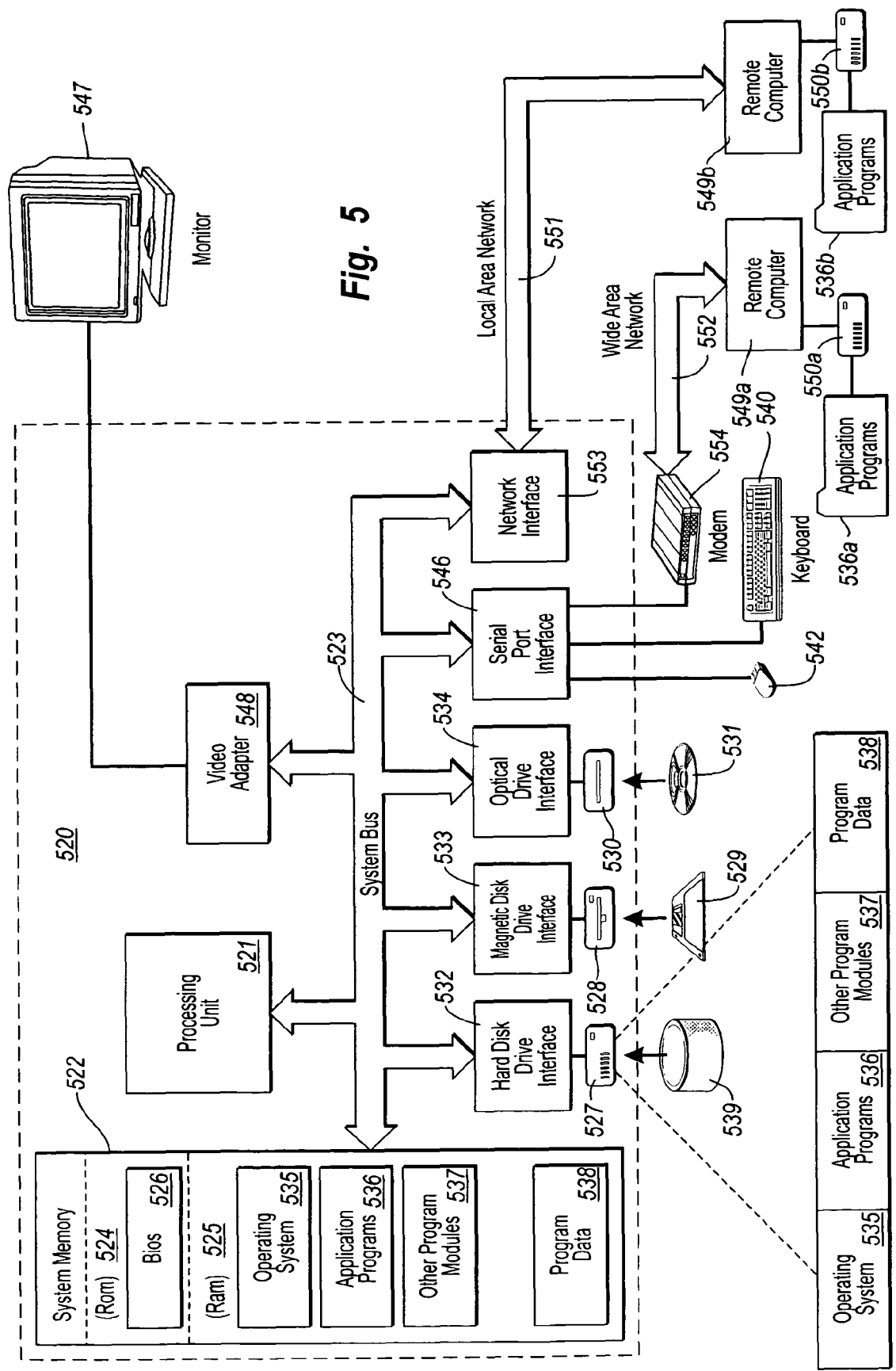
FIG. 5 illustrates an example system that provides a suitable operating environment for the present invention.

FIG. 5 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disk drive 530 for reading from or writing to removable optical disk 531 such as a CD-ROM or other optical media. The magnetic hard disk drive 527, magnetic disk drive 528, and optical disk drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disk 531, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 539, magnetic disk 529, optical disk 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 48. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a distributed system, a method of configuring a message for transfer between endpoints by recursively passing the message through pluggable modular channel components of a runtime communication channel, wherein each of the pluggable modular channel components implement one of a plurality of standard interfaces that allow processing details of communication semantics between other components or modules to be represented in a polymorphic way, the method comprising acts of:
    creating a runtime communication channel comprising a plurality of channel components, wherein each channel component implements a standard interface through which messages and communications semantics to apply to the messages are received from another channel component in the runtime communication channel, and wherein each channel component implements a separate portion of the communication semantics on the messages;
    receiving, at a first channel component in the runtime communication channel, the communication semantics to apply to messages of a message exchange pattern specified in the communication semantics, the communication semantics received through the standard interface selected from a plurality of standard interfaces based on the message exchange pattern;
    receiving, at the first channel component, a message that is part of the message exchange pattern through the standard interface;
    performing, by the first channel component, a portion of the communication semantics on the message;
    passing, by the first channel component, the message and the communication semantics to a second channel component in the runtime communication channel through the standard interface;
    performing, by the second channel component, a portion of the communication semantics on the message that is different from the portion performed by the first channel component, wherein the standard interface abstracts implementation details of the second channel component's performance of the portion of the communication semantics on the message from the first channel component in the runtime communication channel.

2. The method of claim 1, further comprising an act of:
    passing, by the second channel component, the message and the communication semantics to a third channel component in the runtime communication channel through the standard interface for further processing.

3. The method of claim 1, wherein the ordering of the first and second channel components in the runtime communication channel is interchangeable.

4. The method of claim 1, wherein the first channel component receives the message and communication semantics from an application module.

5. The method of claim 4, wherein prior to the first communication channel receiving the message and communication semantics from the application module, the application module determines that the runtime communication channel supports the communication semantics.

6. The method of claim 1, wherein the runtime communication channel includes a third channel component, the method further comprising:
    determining, by the second channel component, that the communication semantics have been completed on the message, and in response, not passing the message to the third channel component in the runtime communication channel.

7. The method of claim 1, wherein the message exchange pattern is chosen from input, output, request, reply or duplex.

8. The method of claim 1, wherein the runtime communication channel is created at a service in response to accepting a previous runtime communication channel from a client.

9. The method of claim 1, wherein the communication semantics further include one or more of transport type, encoding type, unicast support, multicast support, session support, transaction support, security support, protection support, reliable messaging guarantees and queued support.

10. In a distributed system, a method of processing a message for consumption at an endpoint within a service by recursively passing the message through pluggable modular channel components of a service communication channel, wherein each of the pluggable modular channel components implements one of a plurality of standard interfaces that allow processing details of communication semantics between components or modules to be represented in a polymorphic way, the method comprising acts of:

receiving, at a listener, a request for accepting a runtime communication channel;

accepting the runtime communication channel that corresponds to communication semantics that include at least a message exchange pattern;

receiving, at the listener, a message that has been processed in accordance with the communication semantics and is part of the message exchange pattern;

creating a service communication channel for processing the message, wherein the service communication channel comprises a plurality of channel components, wherein each channel component implements a standard interface through which communication semantics and messages of the message exchange pattern that have been formatted according to the communication semantics are received from another channel component in the service communication channel, and wherein each channel component removes a separate portion of the communication semantics from the messages;

passing the communication semantics to a first channel component in the service communication channel through the standard interface selected from a plurality of standard interfaces based on the message exchange pattern; and passing the message to the first channel component through the standard interface;

removing, by the first channel component, a portion of the communication semantics from the message;

passing the message to a second channel component in the service communication channel through the standard interface; and removing, by the second channel component, a portion of the communication semantics from the message that is different from the portion removed by the first channel component, wherein the standard interface abstracts implementation details of the second channel component's removal of the portion of the communication semantics from the message from the first channel component in the service communication channel.

11. The method of claim 10, wherein the communication semantics further include one or more of transport type, encoding type, unicast support, multicast support, session support, transaction support, security support, protection support, reliable messaging guarantees and queued support.

12. The method of claim 10, wherein the message is passed to the listener from a listener factory based on a message filter for the listener.

13. In a distributed system, a method of processing a message for consumption at an endpoint within a service by recursively passing the message through pluggable modular channel components of a service communication channel, wherein each of the pluggable modular channel components implement one of a plurality of standard interfaces that allows processing details of communication semantics between components or modules to be represented in a polymorphic way, the method comprising acts of:

creating a service communication channel comprising a plurality of channel components, wherein each channel component implements a standard interface through which communication semantics and messages of a message exchange pattern that have been formatted according to the communication semantics are received from another channel component in the service communication channel, and wherein each channel component removes a separate portion of the communication semantics from the messages;

receiving, at a first channel component in the service communication channel, the communication semantics that include at least a message exchange pattern, the communication semantics received through the standard interface selected from a plurality of standard interfaces based on the message exchange pattern;

receiving through the standard interface, at the first channel component, a message that has been processed in accordance with the communication semantics and is part of the message exchange pattern; and removing, by the first channel component, a portion of the communication semantics from the message;

passing the message to a second channel component in the service communication channel through the standard interface; and removing, by the second channel component, a portion of the communication semantics from the message that is different from the portion removed by the first channel component, wherein the standard interface abstracts implementation details of the second channel component's removal of the portion of the communication semantics from the message from the first channel component in the service communication channel.

14. The method of claim 13, wherein the communication semantics further include one or more of transport type, encoding type, unicast support, multicast support, session support, transaction support, security support, protection support, reliable messaging guarantees and queued support.

15. The method of claim 13, wherein the ordering of the first and second channel components in the service communication channel is interchangeable.

16. The method of claim 13, wherein the message exchange pattern is chosen from input, output, request, reply or duplex.

17. The method of claim 13, wherein the service communication channel includes a third channel component, the method further comprising:

determining, by the second channel component, that the removal of the communication semantics from the message have been completed and in response, not passing the message to the third channel component in the service communication channel.

\* \* \* \* \*

UNITED STATES PATENT AND TRADEMARK OFFICE
CERTIFICATE OF CORRECTION

| | | |
|---|---|---|
| PATENT NO. | : 7,882,236 B2 | Page 1 of 1 |
| APPLICATION NO. | : 11/051238 | |
| DATED | : February 1, 2011 | |
| INVENTOR(S) | : Bradford H. Lovering et al. | |

It is certified that error appears in the above-identified patent and that said Letters Patent is hereby corrected as shown below:

In column 2, line 25, after "with the" insert -- same programming model can prevent a client runtime from communicating with the --.

Signed and Sealed this
Nineteenth Day of July, 2011

David J. Kappos
*Director of the United States Patent and Trademark Office*